Patented Apr. 22, 1941

2,239,134

UNITED STATES PATENT OFFICE 2,239,134

SINTERED FRICTION ARTICLE AND METHOD OF MAKING SAME

Samuel K. Wellman, Cleveland Heights, Ohio, assignor to The S. K. Wellman Company, Cleveland, Ohio, a corporation of Ohio No Drawing. Application January 31, 1940, Serial No. 316,512

9 Claims. (Cl. 75—22)

This invention relates to frictional articles formed of compressed and sintered powdered material composed at least predominantly of copper and to improved methods of making such articles; but the invention has to do more particularly with friction articles such as clutch plate facings and brake linings.

Frictional articles such as are above referred to commonly are formed of powdered material composed at least predominantly of copper and usually including also one or more other metals such as tin, zinc, lead, aluminum and iron, and one or more non-metallic substances such as silica, calcium oxide, alumina, graphite, etc., the specific composition in any particular case depending upon the function or service to be performed by the sintered body. When the body is to serve as an anti-friction element, such as a bearing bushing, the composition ordinarily includes graphite or the like in addition to the metals used, without any high friction material such as silica, whereas when the body is to generate frictional resistance, as in a clutch, brake or the like, a suitable abrasive or polishing material such as silica, calcium oxide, alumina or the like is ordinarily included. The term "frictional" is used herein in a generic sense applicable both to materials which are used to secure high coefficient of friction, suitable for clutch facings, brake linings and the like, and to materials used to secure low coefficient of friction, suitable for bearing bushings and the like, while the terms "friction" and "anti-friction" are applied to materials used to secure high coefficient of friction and low coefficient of friction, respectively.

Methods of compressing, forming, sintering and mounting sintered bodies such as are here referred to are well known and need not here be described. A typical composition of such powdered material suitable for clutch facings is as follows:

(a) 67.26% copper, 5.31% tin, 9.30% lead, 6.62% iron, 7.08% graphite, and 4.43% silica.

The materials making up the above stated powdered mixtures fall into two classes, namely, friction material and anti-friction material, each of which includes metals and non-metals.

Heretofore, in the preparation of friction materials such as those above referred to, it has been customary to use one form or another of commercially available copper powder. Several methods are known and used for the production of copper powder, including the reduction of copper oxide, atomization of molten copper, electrolytic deposition, mechanical grinding or pulverizing and precipitation from solutions of copper salts. Copper powder produced by any of these methods as heretofore practiced is relatively costly since such methods treat metallic copper as the source material, to the cost of which must be added the cost of reducing the solid metals to the powder state.

It is an object of the present invention to provide sintered friction elements of the character referred to above having superior friction properties, relatively great durability and good bonding properties.

Another object of the present invention is the provision of improved methods of producing sintered bodies of the character in question whereby the cost of producing the powdered mix to be sintered is substantially reduced.

The present improvements are based upon the discovery that it is possible to produce copper powder suitable for the production of sintered friction bodies by chemical precipitation of copper from salt solutions thereof prepared by direct treatment of copper-bearing raw material instead of refined metallic copper and that other materials precipitated along with the copper are of such a nature as to fall within the two groups of materials mentioned above, as making up the powder mixtures used for the production of sintered bodies, namely, friction material and antifriction material, so that it is possible to incorporate the precipitated mixture of materials directly in the powder mixture to be sintered if the composition of the precipitated mixture is determined and modified, if necessary, to conform to the required or desirable composition.

The invention thus makes it possible to reduce the cost of producing the powder mixtures required for sintering because it avoids expense incident in prior processes to the initial production and refinement of the metallic copper from which the powder is made in the prior processes. Furthermore, it has been found that sintered bodies made of powder mixtures prepared directly from copper-bearing raw material have characteristics which are superior to those of sintered bodies utilizing copper powder made from refined metal.

Briefly stated, the improved friction bodies are produced by leaching a suitable copper-bearing raw material, such, for example, as oxidic copper ores, roasted or oxidized copper sulphide ores and impure scrap metal, to form a copper compound in solution, then separating the solution from undissolved solids of the raw material, then contacting said solution with a solid substance, such as iron, zinc, aluminum or the like, capable of reacting with the copper compound in solution to precipitate metallic copper in comminuted form, then checking the composition of the precipitate as to copper and other metallic and non-metallic substances present with the copper, then adding to the precipitate substances necessary to bring it substantially to the composition desired for the powder mix to be sintered, and finally forming and sintering the resulting material in accordance with prior practice.

In adjusting the precipitated material to the desired composition, if the components of the precipitated mixture other than copper are all below, or not in excess of, the percentages respectively required, then it is simply a matter of adding enough of each constituent which is deficient in amount. On the other hand, if the precipitated mixture has an excess of one or more of the constituents other than copper, then enough relatively pure copper powder may be added to the mixture to reduce the constituent most largely in excess to the required percentage and deficiencies of other constituents made up by suitable additions to the mixture. Where two or more constituents are in the group of anti-friction materials or the group of friction materials, it may be sufficient in adjusting the composition of the precipitated mixture to bring the total percentage of the constituents of a group to the required value without bringing the percentage of each constituent to a predetermined value.

In order that the invention may be clearly understood a specific example of procedure will now be described.

A copper oxide ore is ground to a degree of fineness suitable for efficient leaching treatment and the ground material is treated in conventional manner with a water solution of sulphuric acid of suitable concentration to convert the copper content of the ore to a soluble state. Depending upon the composition of the ore, soluble sulphates of other materials, such as lead, iron, zinc, aluminum, etc., may be formed in addition to copper sulphate. The resulting solution containing the copper is then filtered or otherwise clarified by removal of solid impurities, and is passed into contact with scrap iron of one sort or another. Discarded tin cans are suited for the purpose although scrap cast iron, steel, iron turnings and borings, etc., may be used. The iron reacts with copper sulphate causing precipitation of the copper in comminuted form. As the solution becomes impoverished with respect to copper, fresh solution is added and precipitation continued. As the copper precipitates from the solution, an equivalent amount of iron is dissolved, so that if sufficient copper solution is brought into the reaction chamber, the iron may ultimately be nearly completely dissolved, while copper powder will have taken its place. When this condition is reached, the copper powder, containing some iron sulphate solution, also impurities originating in impure iron used and portions of the ore and salts thereof, is removed from the reaction chamber, washed to free it from adhering solution and dried. The resulting copper powder will contain small amounts of various impurities such as iron, silica, alumina, lime, sulphur and sometimes lead and carbon.

The dried powder thus produced is then screened and the material too coarse for use is ground up, screened and mixed with the other fine material. If undesired metallic iron is known to be present in the powder material the latter can be run over a magnetic separator to effect removal of such iron.

The powder material prepared in the manner above described varies to a considerable extent in composition depending upon the composition of the ore, on the care exercised in clarifying the solution which is introduced in the precipitation chamber, on the purity of the scrap iron which is used, on the completeness with which the copper is washed free from the mother liquor and on the care which is taken to avoid contamination of the powder material removed from the precipitation chamber.

In the use of the precipitated copper powder the latter, after being prepared as above described, is analyzed and the analysis checked against a predetermined composition of the powdered mixture to be sintered. Typical analyses of precipitated copper powder prepared as described are as follows:

| | Free Cu | Cu oxides | Free iron | $Fe_2O_3$ | C | CaO | Insol. residue | Total Cu | Total Fe | Total O |
|---|---|---|---|---|---|---|---|---|---|---|
| 1 | 75.95 | 17.58 | 1.0 | 2.98 | 0.2 | 0.6 | 1.7 | 90.0 | 3.1 | 4.4 |
| 2 | 67.41 | 26.75 | 1.09 | 1.50 | 1.48 | 0.23 | 1.54 | 88.81 | 2.14 | 5.83 |

In the above compositions small amounts of such substances as silica, alumina and sulphur are lumped together as "residue."

Assuming that the precipitated material represented by Formula 1 above is to be used to produce a powder material suitable for sintered clutch facings and approximately corresponding to the typical powder material mixture given above, as Formula $a$, as suitable for that purpose, it is noted that the precipitated material is 90% total copper so that a mixture made up of about 75% of said material will contain about 67% of copper as required to correspond to the typical mixture. Proceeding on this basis a mixture is made up corresponding to Formula $a$ and having the composition:

($a'$) 74.9% copper precipitate; 4.31% tin; 8.40% lead; 5.2% iron; 7.28% graphite.

It will be observed that no silica is included in Formula $a'$. This is in part because the "insoluble residue" of Formula 1 will act as friction material. Also, while the copper oxides and iron oxide of the precipitated material during sintering are partially reduced by graphite present in the mixture and by the reducing atmosphere usually present during sintering, certain amounts of the oxides may remain and these also will function as friction material, in addition to silica and other non-metallic friction materials originally present in the copper precipitate.

The powdered mixture ($a'$), in accordance with known practices, may be compressed to form a clutch facing body and the latter then sintered. In fact clutch facings have been made in accordance with Formulas $a$ and $a'$ and subjected to comparative tests. The mixture corresponding to Formula $a$ was made up with commercially pure electrolytic copper powder, while Formula *a'* was made up with unrefined copper precipitate. The mixtures were tested with the following results.

|  | *a* mix | *a'* mix |
|---|---|---|
| Density before sintering | .1848 | .1655 lbs. per cu. in. |
| Density after sintering | .1988 | .2080 lbs. per cu. in. |
| Shrinkage in sintering | .0104 | .0295 inches (thickness). |
| Wear (for equal service) | .0068 | .0028 inches (thickness). |
| Friction | .304 | .366. |

Facing *a* showed signs of fading at 75 M. P. H. while facing *a'* did not fade during the test which was carried up to a speed of 80 M. P. H.

It will be noted that facing *a'* showed much less wear than facing *a*, somewhat higher friction and no fading—a notable aggregate superiority. To these superior working properties is to be added a substantial saving in cost due to the lower cost of the precipitated copper in comparison with copper powder made from refined metal. It is to be noted, too, that compressed powdered bodies made with the precipitated copper are readily welded to ferrous backing members in accordance with the methods disclosed in the United States patent to Wellman, No. 2,178,527. Sintered facings made from the precipitated copper seem to have somewhat lower strength than those made from refined copper powder, but the strength of the former is ample, particularly where the facings are adequately supported by welding to ferrous backing members.

The reasons for the superior working properties of the frictional bodies made with the precipitated copper are not fully understood but it is believed that they may be due in part to the presence of metallic oxides and in part to favorable particle size distribution of the precipitated copper, a relatively large part of the latter material having relatively large particle sizes after grinding. The presence in the precipitated copper of significant amounts of metallic oxides and especially of copper oxides, is probably largely due to the conditions under which the comminuted metal is formed and to the operation of drying the wet precipitated material. The grinding required in the preparation of the material also favors formation of oxide. By control of the drying and grinding operations some control may be had over the amount of copper oxide formed. Similarly, no explanation has been established for the excellent welding properties of the precipitated copper. The unrefined character of this material and its non-metallic appearance would lead one to suppose that it would have poor sintering and welding properties, but sintering and welding of the material carried out in accordance with the methods explained in the said Patent No. 2,178,527 have demonstrated that its sintering and welding properties are excellent. As indicated, the reason for this is not definitely known but it is believed that it may be due, at least in part, to the presence of copper oxides in the material. During sintering and welding, a part of these oxides may be reduced. The nascent copper formed by the reduction is believed to be favorable to good bonding.

The present invention is not limited to the use of sulphuric acid in the leaching of the copper-bearing raw material, although such use is preferred because sulphuric acid is usually available at lower cost than other solvents. In some cases, however, it may be desirable to use some other acid, such as sulphurous acid or hydrochloric acid or suitable salts of any of the three acids named, or mixtures of such acids and salts.

As has been stated, various forms of copper-bearing raw material can be used in carrying out the present invention, but probably the copper ores constitute the most satisfactory source, all things considered. In utilizing copper ore as the raw material source it may be desirable to take advantage of the large scale processing of the copper ores in the recovery of metallic copper by precipitation methods. Thus, it is customary in the treatment of certain of the copper ores to leach the ore, separate the copper solution from the residue, and precipitate the copper with iron to produce what is commonly known in the trade as "cement copper." This latter impure material after drying is smelted and otherwise treated to produce the more or less refined copper of commerce. In other words, the cement copper referred to is an intermediate product in the commercial production of metallic copper; and heretofore, as far as is known, it has had no use as an independent product. However, this material constitutes a ready-made form of the impure comminuted copper produced by precipitation in accordance with the method of the present invention, and where the so-called cement copper is available, it has been found to be susceptible of very satisfactory use in the practice of the method of the present invention and the production of frictional articles having the improved characteristics above described.

It will be understood that the specific procedure which has been described for purposes of illustration and explanation can be varied in the practice of the invention within the scope of the appended claims.

What I claim is:

1. A method of making friction bodies of sintered powdered material of approximately predetermined composition including copper predominantly and other metallic and non-metallic substances, the said method comprising the steps of leaching a copper-bearing raw material to form in solution compounds of copper and of other metals present in the raw material; separating the solution from undissolved solids of the raw material; contacting said solution with a solid substance capable of reacting with the metal compounds in solution to precipitate elemental copper and other metals in comminuted form under oxidizing conditions with resultant conversion to metallic oxide of a fractional part of at least the copper constituent of the precipitate; separating the precipitated material and intermixed oxide from the solution and from at least the major part of any unconsumed solid precipitant; checking the composition of the precipitate and intermixed oxide as to copper and other metallic and non-metallic substances; adding to the said precipitate and oxide substances necessary to establish therein approximately the said predetermined composition; and sintering the resulting material.

2. A method as claimed in claim 1 in which a copper-bearing ore is used as the raw material to be leached.

3. A method as claimed in claim 1 in which a copper-bearing ore is used as raw material and is leached with a sulphuric acid solution.

4. A method as claimed in claim 1 in which the sintering is carried out under conditions effecting a partial reduction of at least the copper oxide present.

5. A method as claimed in claim 1 in which the step of sintering is carried out under conditions effecting a partial reduction of at least the copper oxide present and simultaneously effects the bonding of the sintered material to a reinforcing structure of dense metal.

6. A coherent sintered friction article of substantially predetermined composition composed predominantly of comminuted copper and containing other metallic and non-metallic material in comminuted form, the said article being produced substantially as described in claim 1.

7. A coherent sintered friction article of substantially predetermined composition composed predominantly of comminuted copper and containing other metallic and non-metallic material in comminuted form, the said article being produced substantially as described in claim 1 and with the use of copper-bearing ore as the raw material.

8. A coherent sintered friction article of substantially predetermined composition composed predominantly of comminuted copper and containing other metallic and non-metallic material in comminuted form, the said article being produced substantially as described in claim 1 and with the use as raw material of a copper-bearing ore and the leaching thereof with sulphuric acid solution.

9. A coherent sintered friction article of substantially predetermined composition composed predominantly of comminuted copper and containing other metallic and non-metallic material in comminuted form, the said article being produced substantially as described in claim 1 and with the sintering carried out under conditions effecting a partial reduction of at least the copper oxide present.

SAMUEL K. WELLMAN.